United States Patent Office 3,605,841
Patented Sept. 20, 1971

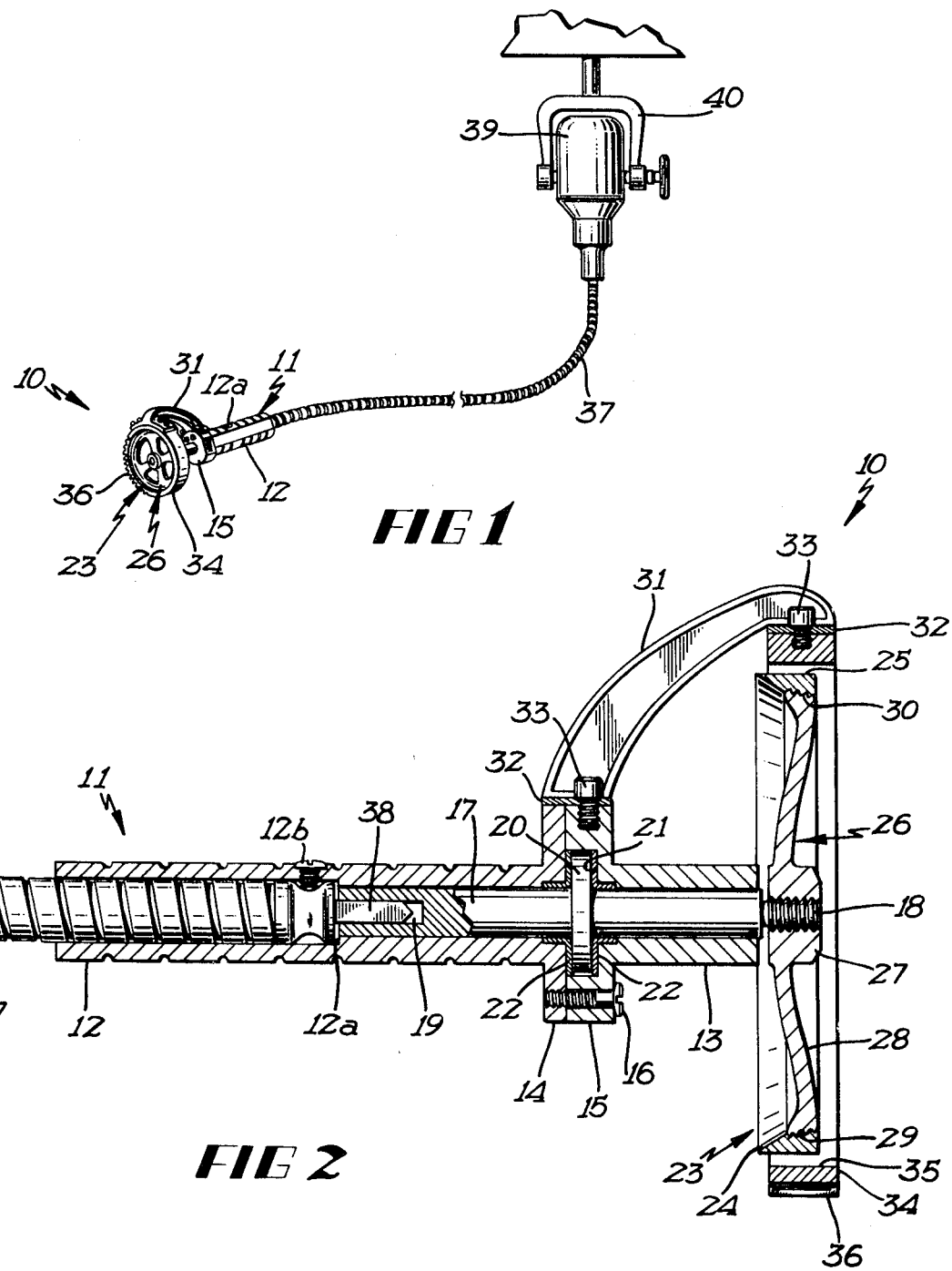

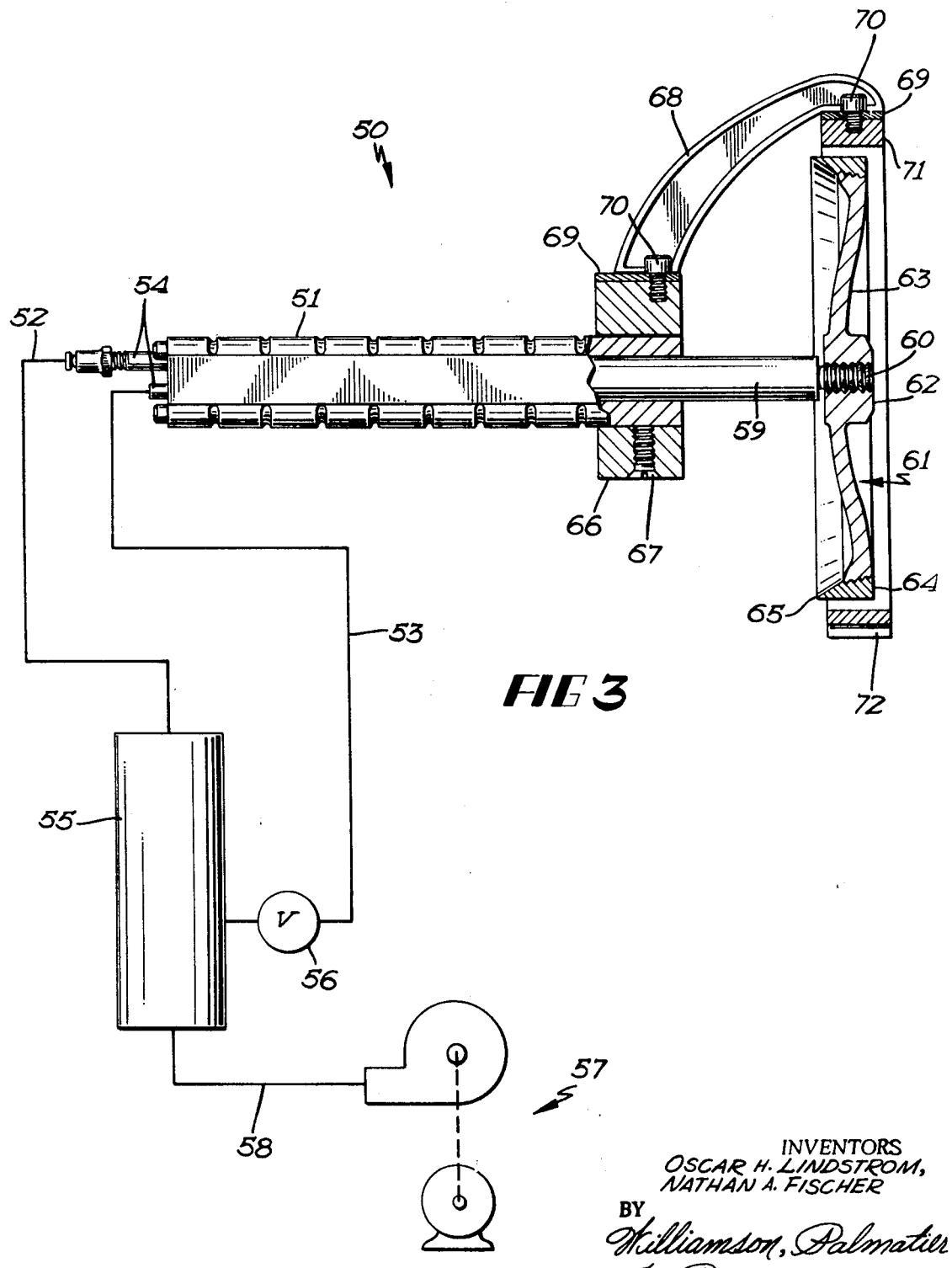

3,605,841
CUTTING DEVICE
Oscar H. Lindstrom and Nathan A. Fischer, Austin,
Minn., assignors to Geo. A. Hormel & Co., Austin,
Minn.
Filed Mar. 24, 1970, Ser. No. 22,163
Int. Cl. A22c 17/12
U.S. Cl. 146—203    5 Claims

ABSTRACT OF THE DISCLOSURE

A cutting device for removing fat from a chunk of meat includes a handle having a revolvable shaft therein, which is connected at its forward end to an annular blade. An annular guard member is positioned around and spaced from the annular blade, and the guard member has a serrated exterior surface which is positioned against the surface of the meat which is to have the fat removed therefrom. In one form of the invention, a flexible drive shaft is connected to a shaft in the handle, and in another form, an air motor is positioned interiorly of and constitutes a part of the handle for revolving the annular blade.

SUMMARY OF THE INVENTION

One of the problems associated with commercial cutting devices used in the removal of fat from meat is the maintenance of such devices. In these commercial devices, a driven circular blade is utilized to cut the fat from the chunk of meat and is driven from an electric motor by a gear drive. The blade itself is expensive since a part thereof usually constitutes a ring gear. Therefore the replacement of the blade, when neceessary, involves an expensive maintenance cost.

It is therefore a general object of this invention to provide a novel cutting device having an annular cutting blade which is readily removable from the shaft, and which is of simple and inexpensive construction. With this arrangement, replacement of the blade involves a minimal cost compared to the conventional systems. It has also been found that the present cutting device is easier to use than the current commercially available knives, and is more effective in removing the fat from the chunk of meat.

BRIEF DESCRIPTION OF THE FIGURES
OF THE DRAWINGS

FIG. 1 is a perspective view of the cutting device;
FIG. 2 is an enlarged cross-sectional view thereof; and
FIG. 3 is a side view, partly in section and partly in elevation, illustrating a modified form of the cutting device.

DETAILED DESCRIPTION OF THE
INVENTION

Referring now to the drawings and more specifically to FIG. 1, it will be seen that one embodiment of the novel cutting device, designated generally by the reference numeral 10, is there shown. This cutting device includes an elongate, hollow metal handle 11, comprised of a rear handle portion 12 and a front handle portion 13. An outwardly projecting flange 14 is integrally formed with the front of the rear handle portion 12, and an outwardly projecting flange 15 is integrally formed with the rear of the front handle portion 13. These flanges are disposed in engaging relation and are provided with threaded apertures which accommodate bolts 16 to fixedly connect these front and rear portions together.

The hollow interior of these handle portions accommodates a cylindrical shaft 17 which is revolvable therein. It will be noted that the shaft 17 has an externally threaded reduced extension 18 projecting axially forwardly from the front end of the front handle portion 13. It will also be noted that the shaft 17 has a rearwardly opening recess 19 in the rear end portion thereof and this recess is of rectangular cross-sectional configuration.

The shaft 17 has a radial collar 20 affixed thereto and projecting outwardly therefrom into the enlarged portion 21 of the hollow interior of the front handle portion 13. Suitable thrust bearings 22 revolvably support the shaft and cooperate with the collar 20 to prevent axial movement of the shaft. It will therefore be noted that in order to remove the shaft 17 from the handle, the front and rear sections must be disassembled.

The shaft 17 serves to revolve an annular cutting blade 23 which is provided with a rear beveled cutting edge 24. In this regard, it will be noted that the blade 23 presents a smooth cylindrical exterior surface 25.

Means are provided for detachably connecting the annular blade 23 to the shaft 17 and this means includes a blade connecting member 26 which is comprised of an internally threaded hub 27 which threadedly engages the threaded extension 18 of the shaft 17. The hub 27 has a plurality of arms 28 integrally formed therewith and projecting radially outwardly therefrom. These arms 28 have threaded ends 29 which threadedly engage the threaded interior surface 30 of the blade 23. With this arrangement, the annular blade may be readily detached from the blade connecting member 26.

An elongate generally curved bracket 31 is provided with attachment plates 32 at opposite ends thereof, these attachment plates being provided with suitable apertures therein through which the bolts 33 project. It will be noted that one of the attachment plates 32 is positioned in engaging relation with the flanges 14 and 15 and the associated bolts therewith threadedly engage threaded apertures in the flange 15.

The other attachment plate is positioned against the exterior surface of an annular guard member 34 and the associated bolts threadedly engage threaded apertures in the guard member. It will be noted that the annular guard member 34 is positioned around but radially spaced from the exterior cylindrical surface of the annular cutting blade 23. It will further be noted that the annular guard member presents a smooth cylindrical inner surface 35, as best seen in FIG. 2. The exterior surface of the annular guard member has a serrated portion 36 which extends throughout an arc of less than 180°. This serrated surface is adapted to be positioned against the surface of the meat from which the fat is being removed. It will also be noted that the rear cutting edge 24 of the blade 23 projects axially beyond the rear edge of the annular guard member 34.

Means are provided for revolving the shaft 17 and this means comprises an elongate flexible drive shaft 37 which projects interiorly of the rear handle portion 12.

This flexible drive shaft is provided with a reduced extension 38 which is of generally rectangular cross-sectional configuration and which projects interiorly of the rectangular shaped recess 19 in the shaft 17. Thus the revolvable flexible shaft serves to revolve the shaft 17 and blade 23 connected therewith.

It will be noted that the interior of the rear handle portion includes an enlarged rear end portion that accommodates the flexible shaft 37 and therefore presents an annular shoulder 12a against which the flexible shaft abuts. A set screw 12b threadedly engages a threaded bore in the handle and projects into an annular recess in the front end portion of the flexible shaft 37 to prevent retraction of the shaft relative to the handle 11.

The shaft is connected by a suitable coupling to the output shaft of an electric motor 39 which is pivotally mounted on a bracket 36 suspended from an overhead support. During operation of the cutting device, the handle will be held by a user and the motor will be energized to revolve the blade 23. The guard member will be positioned against the chunk of meat from which the fat is to be removed so that the serrated exterior surface portion 36 engages the surface of the meat. These serrations are necessary to facilitate overcoming the torque action produced by the knife during the cutting action. The cutting device will then be pulled towards the user to permit the fat to be removed from the chunk of meat. The cylindrical space located between the cylindrical exterior surface of the blade 23 and the interior cylindrical surface of the guard member permits particles of fat to pass between the blade and guard member and minimizes any tendency of the material accumulating in this area.

When the blade becomes worn, the blade connecting member 26 may be removed from the threaded extension of the shaft and the blade may thereafter be removed from the blade connecting member and replaced by a new blade. Because of the simple and inexpensive construction of the blade 23 replacement of the same involves only a minimal maintenance cost. As pointed out above, the cutting device also has been found to be easier to use than the commercially available cutting devices and is thought to be more effective in removing the fat from the chunk of meat. Since the drive of the blade 23 is directly from the shaft 17, cleaning of the cutting device involves a relatively simple operation.

Referring now to FIG. 3, it will be seen that a modified form of the cutting device, designated generally by the reference numeral 50 is there shown. This cutting device also includes an elongate handle 51 which is of substantially single piece construction, the interior of which defines a rotary type air motor. One end of an inlet conduit 52 and one end of an outlet conduit 53 are connected to suitable fittings 54 secured to the rear end of the handle, the other ends of the conduits being connected to an accumulator 55. A valve 56 is interposed in flow controlling relation with respect to the outlet conduit 53. A compressor 57 comprised of a motor and pump is connected to a conduit 58 which, in turn, is connected to the accumulator 55 so that the accumulator is supplied with air under pressure by the comprssor.

The rotary air motor has an output shaft 59 which is revolved when air is supplied to the motor and which projects exteriorly of a handle 51. The forward end of the shaft has a reduced threaded extension 60 thereat, and a blade mounting member 61 including an internally threaded hub 62 is threadedly mounted thereon, the hub being provided with radially extending arms 63. The outer ends of the arms 63 are threaded and threadedly engage the internal threads of the blade 64. Again it will be noted that the blade 64 has a rearward beveled annular cutting edge 65. Thus it will be seen that the blade and blade mounting member are identical to that illustrated in the embodiment of FIG. 1.

A cylindrical collar 66 is mounted on the front end of the handle 51 by means of bolts 67 which threadedly engage in threaded apertures and bear against the exterior surface of the handle. A curved bracket 68 having plates 69 integral with opposite ends thereof is mounted on the collar 66. In this regard, the plates 69 are provided with apertures for accommodating bolts 70, one set of bolts engaging the collar 66 to mount the bracket 68 thereon.

The other plate 69 is positioned against an annular guard member 71 and the associated bolts 70 threadedly engage threaded apertures in the guard member to mount the guard member around but radially spaced from the exterior surface of the blade 64. In this regard, it will be noted that the guard member 71 has a smooth cylindrical inner surface while the blade 64 has a smooth cylindrical exterior surface. The exterior surface of the guard member 71 has serrations 72 formed in a portion thereof and in the embodiment shown, these serrations extend through an arc of less than 180° substantially identical in manner to that illustrated in the embodiment of FIG. 1.

The cutting device illustrated in FIG. 3 operates in substantially the same manner as that of FIGS. 1 and 2 with the exception that a valve will be used to actuate and re-actuate the operation of the cutting device of FIG. 3, while closing and opening of an electro-mechanical switch is required in the operation of the cutting device of FIGS. 1 and 2. Air will be supplied to the rotary air motor through the inlet conduit 52 and will be evacuated from the air motor through the outlet conduit 53. The rotor of the air motor will be revolved to revolve the shaft 59 and the blade 64.

From the foregoing description, it will be seen that we have provided a novel cutting device which utilizes a power driven blade that may be readily removed from the cutting device when worn. It will also be noted that the simple and inexpensive construction of the blade permits replacement thereof at a minimal maintenance cost as compared to blades of the commercially available cutting devices.

Finally, it will be seen from the foregoing description that we have provided a cutting device, which is not only of simple and inexpensive construction, but one which functions in a more efficient manner than any heretofore known comparable cutting device.

What is claimed is:

1. A cutting device for removing fat from a chunk of meat, comprising
   an elongate hollow handle having front and rear ends,
   an elongate shaft positioned in said handle and being revolvable relative thereto,
   an annular blade,
   means detachably connecting said blade with the front end of said shaft whereby said blade is revolved with said shaft about an axis extending longitudinally of the handle, said blade having an annular cutting surface defined by its rearward edge,
   an annular guard member positioned around and spaced axially from said blade,
   means mounting said guard member on said handle, said guard member having a plurality of serrations in a portion of the exterior surface thereof, and drive means connected with the shaft to revolve the same.

2. The cutting device as defined in claim 1 wherein said means connecting said annular blade with said shaft comprises a mounting member connected with the front end of said shaft, and having a plurality of arms projecting outwardly therefrom, an inner circumferential portion of said blade being threaded, the outer ends of said arms being threaded and threadedly engaging the threaded circumferential portion of the blade.

3. The cutting device as defined in claim 1 wherein said handle includes a front portion and a rear portion, means detachably connecting said front and rear portions together, said shaft having a collar affixed thereto positioned interiorly of said handle and preventing a longitudinal movement thereof relative to the handle.

4. The cutting device as defined in claim 1 wherein said drive means comprises an air motor disposed interiorly of said handle, and conduits connecting said air motor to a source of air under pressure.

5. The cutting device as defined in claim 2 wherein said shaft has a threaded extension thereof projecting exteriorly of said handle, said mounting member including a threaded hub threadedly engaging the threaded extension of the shaft.

References Cited

UNITED STATES PATENTS

| 1,872,731 | 8/1932 | Goranson et al. | 146—43 |
| 3,058,502 | 10/1962 | Loveland et al. | 146—43 |
| 3,269,010 | 8/1966 | Bettcher | 30—276 |

WILLIE G. ABERCROMBIE, Primary Examiner

U.S. Cl. X.R.

146—43, 106; 30—276, 316